United States Patent [19]
Studen

[11] 3,876,069
[45] Apr. 8, 1975

[54] METHOD AND APPARATUS FOR PROJECTING TIRE BEADS

[76] Inventor: Charles E. Studen, 496 Ransome Rd., Cleveland, Ohio 44143

[22] Filed: Feb. 1, 1973

[21] Appl. No.: 328,602

[52] U.S. Cl............................... 206/304; 206/523
[51] Int. Cl...................... B65d 85/06; B65d 85/02
[58] Field of Search........ 206/46 T, 52 F, 53, 47 R, 206/65 R, 304, 523; 150/54 B; 156/96

[56] References Cited
UNITED STATES PATENTS

| | | | |
|---|---|---|---|
| 2,348,084 | 5/1944 | MacChesney et al. | 206/304 |
| 2,598,192 | 5/1952 | Poust | 206/46 H |
| 2,822,919 | 2/1958 | Kulka | 206/52 |
| 2,842,262 | 7/1958 | Wismer | 206/47 R |
| 3,044,609 | 7/1962 | Branick | 206/46 T |
| 3,407,926 | 10/1968 | Rosser | 206/65 R |
| 3,730,801 | 5/1973 | Martin | 150/54 B |

FOREIGN PATENTS OR APPLICATIONS 866,405  4/1961  United Kingdom................. 156/96

*Primary Examiner*—William T. Dixson, Jr.
*Attorney, Agent, or Firm*—John H. Mulholland

[57] ABSTRACT

The specification and drawings disclose a device and method of using the same for protecting the beads and interiors of tires in the time interval between manufacture and installation. The disclosed device includes a length of relatively heavy, foamed polymeric or expanded material having a width substantially greater than the total circumferential length of the bead. The length of foamed or expanded material is adapted to be bent into a circle which is slightly greater in diameter than the diameter of the tire bead and collapsed into a somewhat heart-shaped configuration for insertion within the tire bead. In the heart-shaped configuration it can be inserted into the tire bead and the inwardly deflected portion of the heart-shaped configuration toggled outwardly into engagement with the bead. The member is then under a compressive load and tightly engages the bead and covers it. To remove the member the reverse action is required; that is, a radial inward pulling or toggling of a section of the member to return it to the heart-shaped configuration for removal.

1 Claim, 6 Drawing Figures 3,876,069
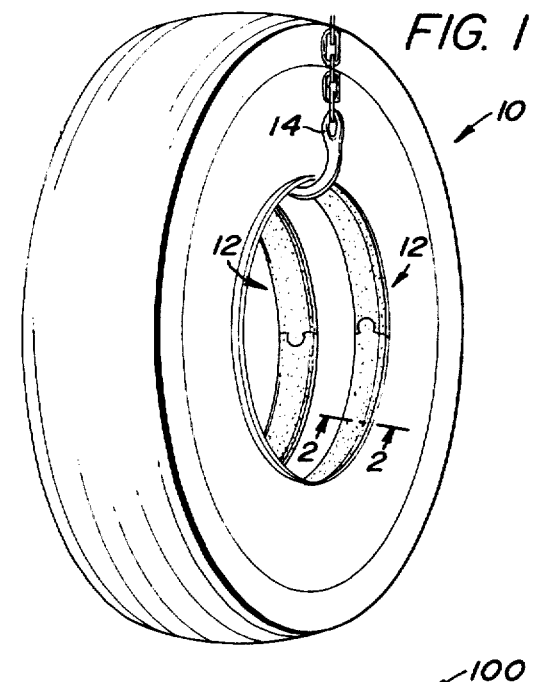
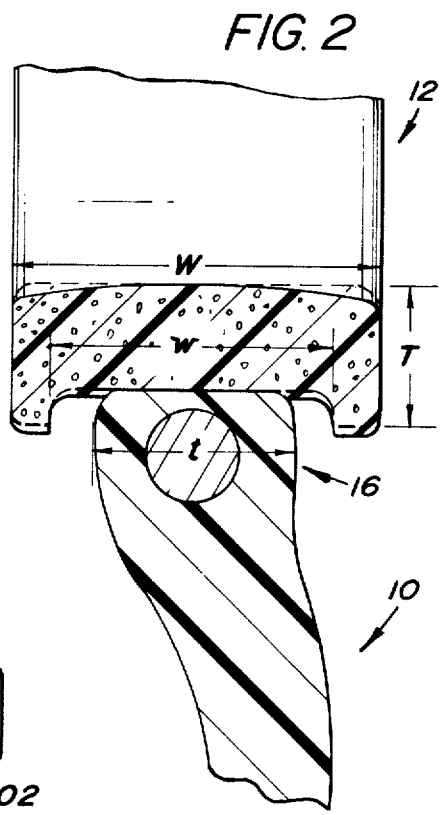
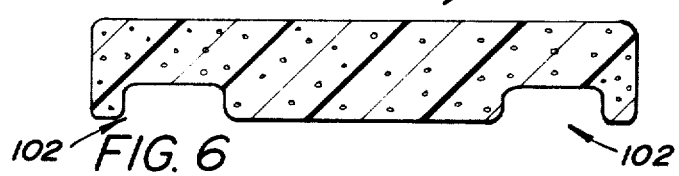
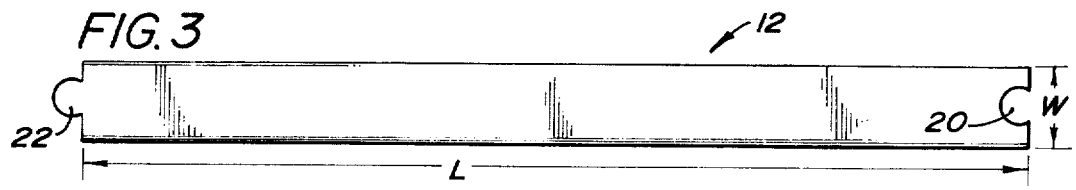
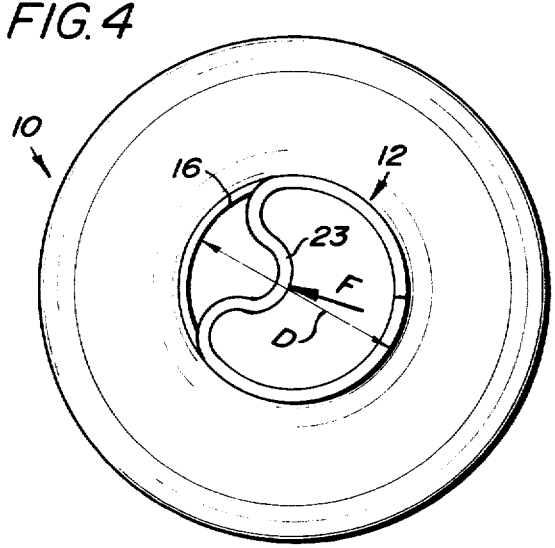
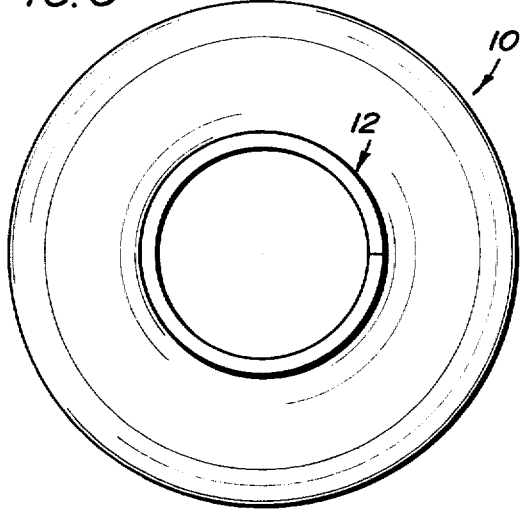

3,876,069

METHOD AND APPARATUS FOR PROJECTING TIRE BEADS

BACKGROUND OF THE INVENTION

The subject invention is directed toward the art of protective devices and, more particularly, to an improved device and method of using the same for protecting the beads and/or interiors of vehicle tires between manufacture and installation.

The invention is particularly adapted for protecting beads of especially large off the road tires of the types used on earth-moving equipment and the like, and will be described with special reference thereto; however, as will become apparent, the invention is capable of broader application and could be used on many types and sizes of vehicle tires.

In the past, problems have been encountered with damage to the beads of tires for large earth-moving equipment during shipment. Often times, the beads have been damaged to an extent such that the entire tire must be scrapped since a seal can no longer be affected between the bead and the wheel or rim. The reason for the damage has generally been the result of the large size and weight of the tires and the necessity of using hoist equipment to move and handle the tires during shipment. For example, it has been standard to use a lift truck's chain hoist, hook or sling with the hook or cable being engaged with the bead to lift the tires and swing them from one location to another.

The size of the tires has made it very difficult and expensive to ship them completely crated or enclosed by a protective housing. For this reason, it has been practice merely to ship them in an exposed condition and expect that a certain percentage of them will be damaged during shipment.

Not only has the cost of packaging or enclosing the tires been prohibited in terms of material required but, further, the labor involved in crating or packaging and subsequently uncrating the tires has been such as to completely eliminate this as an economic means of protecting tires during shipment. Accordingly, there has long been a need for a simple, easily installed and removed means of protecting the tire beads between manufacture and installation.

BRIEF DESCRIPTION OF THE INVENTION

In accordance with one aspect of the invention, there is provided an article adapted to protect the beads of tires prior to installation. The article comprises a length of foamed or expanded material having a width greater than the width of the tire bead. The length of material is somewhat greater than the circumferential length of the tire bead. Preferably, but not necessarily, one side of the length is grooved or recessed to receive the inner periphery of the tire bead. Additionally, it is preferable, but in some cases not necessary, that the ends of the length of the material be arranged so that when the length is formed into a circle, the ends interlock to prevent relative lateral movement. To use the length of material for protecting the tire bead, the length is first formed into a circle with the end portions brought into engagement. At this time the diameter of the length will be somewhat larger than the inner diameter of the bead because its length is greater than the circumferential length of the bead. To permit the length to be inserted into its protective position over the inner circumference of the tire bead, it is deformed into a somewhat heart-shaped configuration such that its maximum dimension is at all points less than the diameter of the bead. It is then positioned within the bead and the inwardly deflected portion of the heart-shaped configuration is forced outwardly. The toggling action of the heart-shaped configuration compresses the length of material along its length to allow it to be brought into engagement with the tire bead. Because of the differences in normal diameters of the tire bead and the length of protective material, hoop stresses are generated in the length causing it to engage the tire bead extremely tightly. The engagement between the length of material and the bead is such that it cannot be moved laterally out of its protecting position except with extreme difficulty. Removal is relatively simple, however, when the member the is pulled radially inwardly to return it to its somewhat heart-shaped configuration.

With the protective members in position over the tire treads, the tires can be handled and shipped without fear of damage to the tire treads. Conventional hoisting equipment, chain hooks or slings and the like can be used as the bead area of the tire is totally protected by the member. Moreover, as can be appreciated by the foregoing, both installation and removal of the protective members are a simple matter which can be accomplished very rapidly. Additionally, the protective devices are very simple to manufacture and comparatively inexpensive. If desired, they can be resued; however, their cost is sufficiently low that they can be disposed of or the material therein used for protective packaging or the like after removal from the tires.

Accordingly, the primary object of the invention is the provision of an improved method and article for protecting the beads and/or interiors of tires between manufacture and installation.

Yet another object of the invention is the provision of an article of the general type described which is inexpensive to manufacture and particularly simple to install and remove.

A still further object of the invention is the provision of an article of the general type described which is very difficult to inadvertently dislodge from its protective position about the tire bead.

BRIEF DESCRIPTION OF THE DRAWINGS

The above and other objects and advantages will become apparent from the following description when read in conjunction with the accompanying drawings wherein:

FIG. 1 is a pictorial view of a tire having beadprotection devices formed in accordance with the invention installed thereon;

FIG. 2 is a cross-sectional view through the protector and bead area of the tire (the view is taken on line 2—2 of FIG. 1);

FIG. 3 is a plan view of the protective device prior to installation in position on a tire bead;

FIGS. 4 and 5 are side elevations of the tire of FIG. 1 showing the protective device in the process of being installed and after it is installed, respectively; and, FIG. 6 is a cross-sectional view similar to FIG. 2 but showing a form of the invention wherein a single member protects both beads and seals the interior of the tire.

DETAILED DESCRIPTION OF THE DRAWINGS

Referring more particularly to the drawings, the overall arrangement of the invention will be described in some detail The specific showings are merely for the purpose of illustrating a preferred embodiment of the invention and are not to be taken as limiting. In particular, FIG. 1 shows a tire 10 having a pair of the protective elements 12 formed in accordance with the invention and installed to protect the beads of the tire during shipment, storage and handling prior to installation. FIG. 1 illustrates how the tires are often lifted and moved which has, in the past, caused damage to the tire beads. As illustrated, merely for example, a chain hook 14 is engaged with one of the tire beads to permit the tire to be lifted by an overhead crane hoist or the like. In the subject embodiment each of the protective devices 12 are illustrated as identical and only one will be described in detail. However, it should be understood that the details could vary from that shown and described.

Referring in particular to FIGS. 2 and 3, the protective device 12 is illustrated as comprising a length L of expanded foam polymeric material such as, for example, expanded polyethylene. The length of the protective member 12 is, for reasons which will subsequently be discussed, slightly greater than the total inner circumference C of the tire bead 16, preferably approximately 2 to 3 percent greater. The width W of the protective member 12 is preferably slightly greater than the width t (see FIG. 2) of the bead 16. Additionally, for reasons which will subsequently become apparent, one of the wide faces 12a of the protective member 12 is preferably grooved or recessed as shown at 13 to a width W which is slightly greater than the width T of the bead 16. The thickness T of the member can vary substantially but should preferably be sufficient to protect the thread against ordinary impacts likely to be encountered during normal shipping and handling.

As best illustrated in FIGS. 1 and 3, the ends 15 of the member 12 are preferably formed so that when the member is coiled or deformed into the circular configuration necessary for performing its protective function, the ends cannot slip laterally relative to one another. Many different types of interlocking arrangements could be used; however, in the subject embodiment one end is provided with a generally circular recess 20 and the other end is provided with a similarly shaped and sized tab 22. Thus, when coiled and interlocked, the ends cannot be moved laterally relative to one another. Although this is the preferred arrangement, it should be understood that many other arrangements could be used and, in many instances, the ends could be merely squared.

To install the protective device 12 into a tire, it is preferably formed into a circle with the tab 22 positioned within the recess 20. In this circular form, its diameter is, of course, somewhat greater than the open diameter within the tire bead 16. To insert it into the opening, it is preferably deformed into a somewhat heart-shaped configuration by pulling in a bight portion 23 as illustrated in FIG. 4. In this form, its maximum transverse dimensions are less than the diameter D within the tire bead 16. It can then be moved laterally into the tire bead opening. At this time the protective member will appear as shown in FIG. 4. Note that all portions of the length are in engagement with the bead except for the bight portion 23. When a force F is applied at the location shown in FIG. 4, a somewhat toggle-like action causes the bight portion 23 to be deflected into the opening. As can be appreciated, in order for the member 12 to fit within the opening, it must be axially compressed. The toggling action compresses it and generates hoop stresses within the member causing it to firmly bind into position against the inner surface of the bead 16.

FIG. 2 shows the general configuration of the cross-section of member 12 after it is firmly in position. The dotted lines illustrate its original shape prior to being firmly fitted into the opening. As shown, the outer lateral edges are somewhat deflected from their original shape and a tight gripping of the tire bead is produced.

To remove the protective element within the tire, it can be manually gripped and pulled radially inward to the center of the opening to deflect it into the somewhat heart-shaped configuration. At this time it can be easily removed laterally from the opening. However, when in place, it is extremely difficult to remove the member by pushing laterally on it. It can be kicked and struck without dislodging it from its position. It should be appreciated that a wrapping band or strap could, however, be used to prevent pilferage of the protector and further limit inadvertent dislodgment.

FIG. 6 is a cross-sectional view through a modified form of protective member which protects both beads and seals the interior of the tire to prevent dirt, water and the like from being deposited therein. In substantially all particulars, the embodiment of FIG. 6 is formed and used in the manner of the FIGS. 1-5 embodiment. However, the member 100 has a width greater than the overall width of the tire measured across both beads. Additionally, member 100 includes a pair of grooves or recesses 102 which are spaced apart and sized to receive both beads of the tire.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. In combination, a vehicle tire having a generally circular body with a wheel receiving opening defined by two relatively rigid beads,
   means protectively enclosing said beads from damage during shipment,
   said means protectively enclosing said beads, including a length of expanded foam polymeric material which when in a normal uncompressed state has a total length greater than the inner circumference of one of the beads and when located in the proper protectively enclosing assembled position within and engaging an inner circumference of at least one of said beads, has the foam surface of one of its ends in contact with the foam surface of the other end, said length being in both hoop compression and longitudinal compression thereby providing means inhibiting lateral relative movement of said ends.

* * * * *